United States Patent
Sun

(10) Patent No.: US 7,375,296 B2
(45) Date of Patent: May 20, 2008

(54) KEYBOARD

(75) Inventor: Zheng-Heng Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,276

(22) Filed: Jul. 21, 2006

(65) Prior Publication Data

US 2007/0084701 A1 Apr. 19, 2007

(30) Foreign Application Priority Data

Oct. 13, 2005 (CN) .................. 200520065907.2

(51) Int. Cl.
*H01H 9/00* (2006.01)

(52) U.S. Cl. .................. 200/5 A; 206/224; 341/22; 345/168

(58) Field of Classification Search ............ 200/5 A; 341/20, 22; 345/156, 168, 169, 173, 184; 361/680; 206/214, 224, 320; 400/472, 485, 400/486, 488–496

See application file for complete search history.

(56) References Cited

U.S. PATENT DOCUMENTS

| | | | | |
|---|---|---|---|---|
| 6,215,420 | B1 * | 4/2001 | Harrison et al. | 341/22 |
| 6,290,411 | B1 * | 9/2001 | Shirai | 400/681 |
| 6,373,471 | B1 * | 4/2002 | Lin | 345/168 |
| 6,529,145 | B1 * | 3/2003 | Lin | 341/22 |
| 6,665,176 | B2 * | 12/2003 | Amemiya et al. | 361/681 |
| 6,681,926 | B2 * | 1/2004 | DeVolpi | 206/224 |
| 6,892,875 | B2 * | 5/2005 | DeVolpi | 206/224 |
| 7,038,598 | B2 * | 5/2006 | Uke | 341/20 |
| 7,123,242 | B1 * | 10/2006 | Henty | 345/169 |

* cited by examiner

*Primary Examiner*—Michael A Friedhofer
(74) *Attorney, Agent, or Firm*—Wei Te Chung

(57) ABSTRACT

A keyboard includes a main body and a plurality of keys arranged on a top plate of the main body. The main body includes the top plate, a bottom plate with a utility board arranged thereon, and a rear plate. The rear plate is flat so that the main body can be placed in an upright on a desktop thus exposing the utility board when the keyboard is not in use.

14 Claims, 2 Drawing Sheets

KEYBOARD

FIELD OF THE INVENTION

The present invention relates to a keyboard of a computer.

DESCRIPTION OF RELATED ART

A contemporary keyboard is generally placed horizontally on a desk, and connected to other computer hardware. The keyboard occupies extra desk space. If an operator needs to do work other than operating the computer, more desk space is needed. The operator may place the keyboard on the floor or push the keyboard to a corner of the desk. In such situations, the keyboard is at risk of being damaged.

In addition, the contemporary keyboard as an input device has very simple functions. The designers often focus their mind on improving keys of the keyboard other than finding other uses for the keyboard.

What is needed is a keyboard which occupies less space on the desk when it is not in use.

What is also needed is a keyboard which has functions other than just data input.

SUMMARY OF THE INVENTION

An exemplary keyboard includes a main body and a plurality of keys arranged on a top plate of the main body. The main body includes the top plate, a bottom plate with a utility board arranged thereon, and a rear plate. The rear plate is flat so that the main body can be stood upright on a desktop thus exposing the utility board when the keyboard is not in use.

Other advantages and novel features will become more apparent from the following detailed description when taken in conjunction with the accompanying drawings, in which:

DETAILED DESCRIPTION OF THE INVENTION

Figure 1:
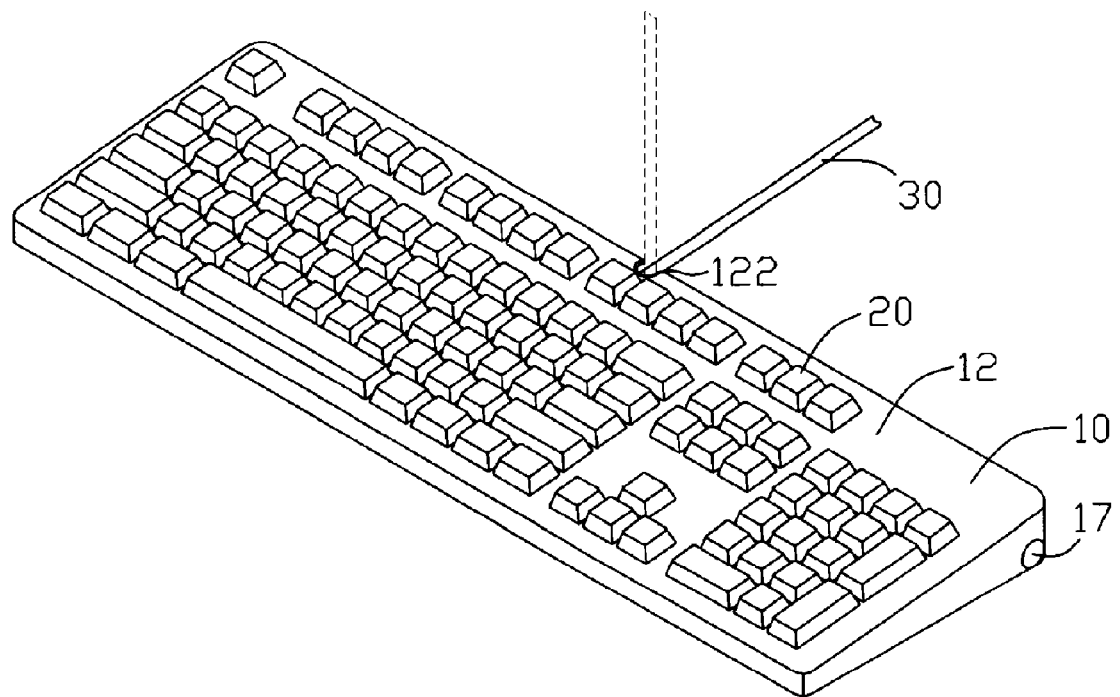
FIG. 1 is an isometric view of a keyboard in accordance with a preferred embodiment of the present invention, showing the keyboard being placed horizontally when it is in use.
Figure 2:
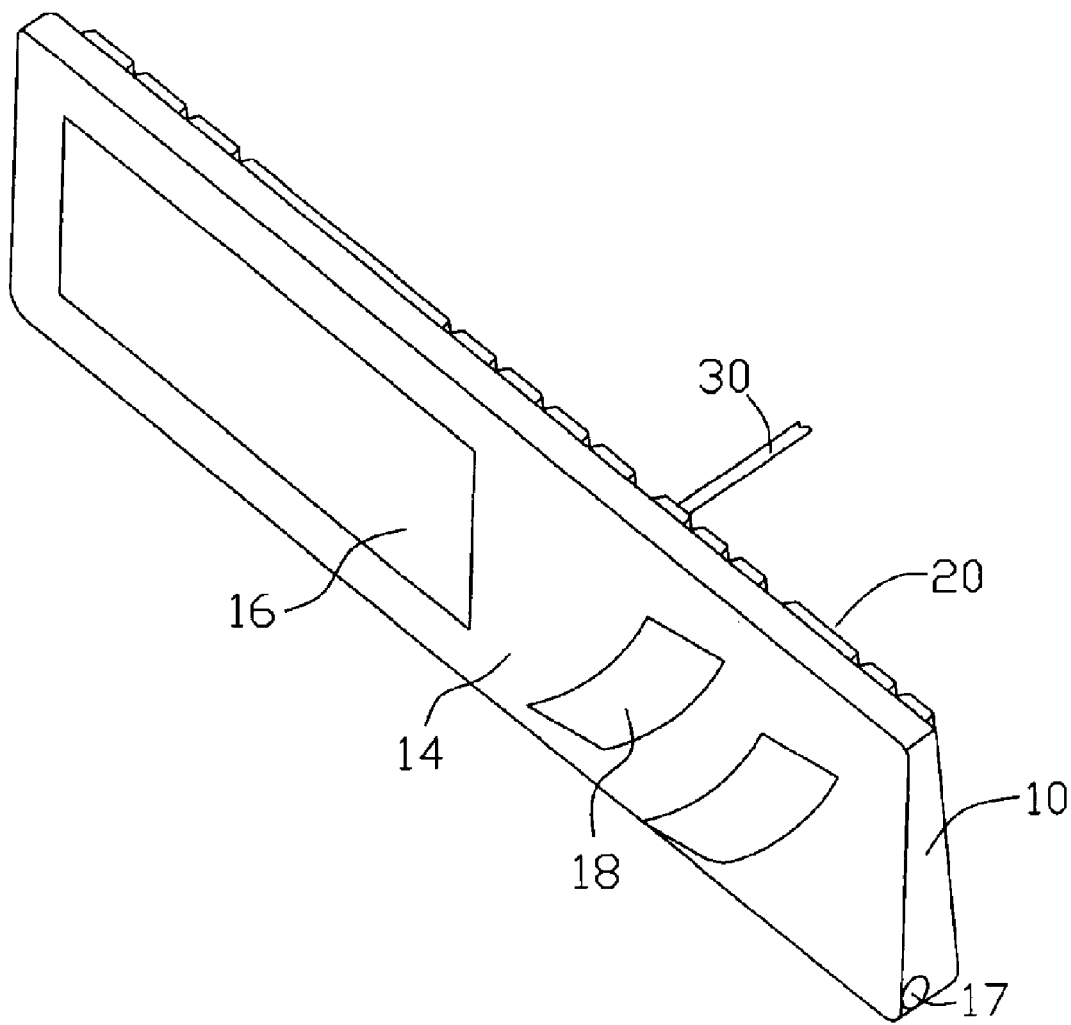
FIG. 2 an isometric view of the keyboard of FIG. 1, showing the keyboard standing upright when it is not in use.

Referring to FIGS. 1 and 2, a keyboard in accordance with a preferred embodiment of the present invention includes a main body 10, a plurality of keys 20, and a cable 30 extending from a rear portion of the main body 10.

The main body 10 includes a top plate 12 and a bottom plate 14. The top plate 12 gradually slopes down from a top of a rear plate of the main body 10 to a top of a front plate of the main body 10. The rear plate of the main body 10 is a flat plate and has an appropriate width. If the keyboard is not in use, the keyboard is rotated upright by hand. Thus, the keyboard stands upright on a desk in front of a computer display. In this situation, the desk area being occupied by the keyboard is reduced considerably. In addition, because the bottom plate 14 is perpendicular to the desktop, the center gravity of the keyboard is suitably arranged so the keyboard does not easily fall over. A cutout 122 is defined in a rear edge of the top plate 12. The cable 30 is received in the cutout 122 when the keyboard is stood upright.

The bottom plate 14 is a flat plate. A small utility board 16 is attached to the bottom plate 14. The utility board 16 maybe used as a bulletin board by an operator, or having a note pad 18 attached thereto, or put to sonic other useful purpose when the keyboard is not in use and stands upright. The utility board 16 may use some or all of the available space of the bottom plate 14 and any remaining space may be put to other purposes. A narrow and deep accommodating hole 17 is defined in a side of the main body 10 for accommodating a pen or other tool for use with the utility board 16.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A keyboard comprising:
   a main body comprising a top plate, a bottom plate with a utility board arranged thereon, and a rear plate, wherein the rear plate is flat so that the main body can be stood upright on a desktop and expose the utility board, a cutout is defined in a rear edge of the top plate for a cable extending therethrough when the main body stands upright; and
   a plurality of keys arranged on the top plate of the main body.

2. The keyboard as claimed in claim 1, wherein the top plate gradually slopes down from a top of the rear plate of the main body to a top of a front plate of the main body.

3. The keyboard as claimed in claim 1, wherein the bottom plate is generally perpendicular to the desktop when the main body stands upright.

4. The keyboard as claimed in claim 1, wherein the bottom plate has a bulletin board attached thereon.

5. The keyboard as claimed in claim 1, wherein a narrow and deep accommodating hole is defined in a side of the main body for accommodating a tool for the utility board.

6. A keyboard comprising:
   a main body comprising a top plate, a bottom plate with a bulletin board attached thereon, a front plate, and a rear plate, the top plate gradually sloping down from a top of the rear plate to a top of the front plate thereby forming a trapezoidal shaped side plate, the rear plate having a certain width suitable to support the main body to stand upright on a desktop and expose the utility board; and
   a plurality of keys arranged on the top plate of the main body.

7. The keyboard as claimed in claim 6, wherein a cutout is defined in a rear edge of the top plate for a cable extending therethrough when the main body stands upright.

8. The keyboard as claimed in claim 6, wherein the bottom plate is generally perpendicular to the desktop when the main body stands upright.

9. The keyboard as claimed in claim 6, wherein a narrow and deep accommodating hole is defined in a side of the main body for accommodating a tool for the bulletin board.

10. A keyboard comprising:
    a main body whose center gravity is suitably arranged so that the keyboard is capable of standing upright an a desktop, comprising a flat rear plate configured to be a base plane for the main body to stand upright thereon, a top plate, a bottom plate with a utility board arranged thereon, a cutout being defined in a rear edge of the top plate for a cable extending therethrough when the main body stands upright; and a plurality of keys arranged on the top plate of the main body.

11. The keyboard as claimed in claim 10, wherein the top plate gradually slopes down from a top of the rear plate of the main body to a top of a front plate of the main body.

12. The keyboard as claimed in claim 10, wherein the bottom plate is generally perpendicular to the desktop when the main body stands upright.

13. The keyboard as claimed in claim 10, wherein the utility board is a bulletin board attached thereon.

14. The keyboard as claimed in claim 10, wherein a narrow and deep accommodating hole is defined in a side of the main body for accommodating a tool for the utility board.

* * * * *